Figures 4, 5:
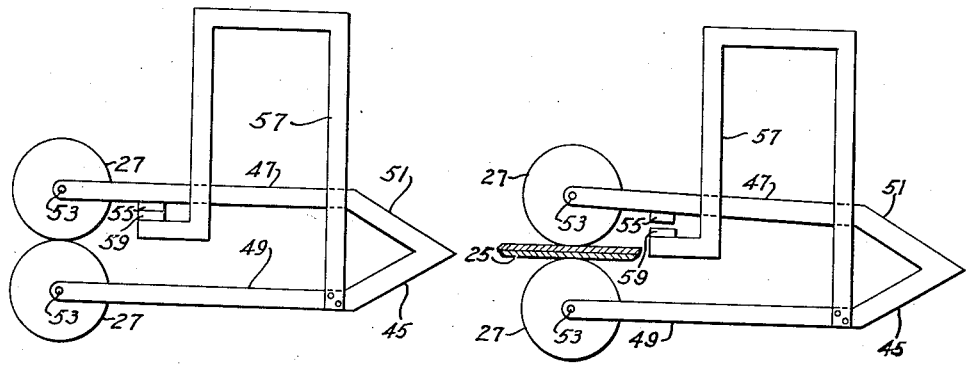

Aug. 6, 1940.                H. DIAMOND ET AL                    2,210,710
                              CONTROL APPARATUS
                            Filed Jan. 29, 1938           5 Sheets-Sheet 1
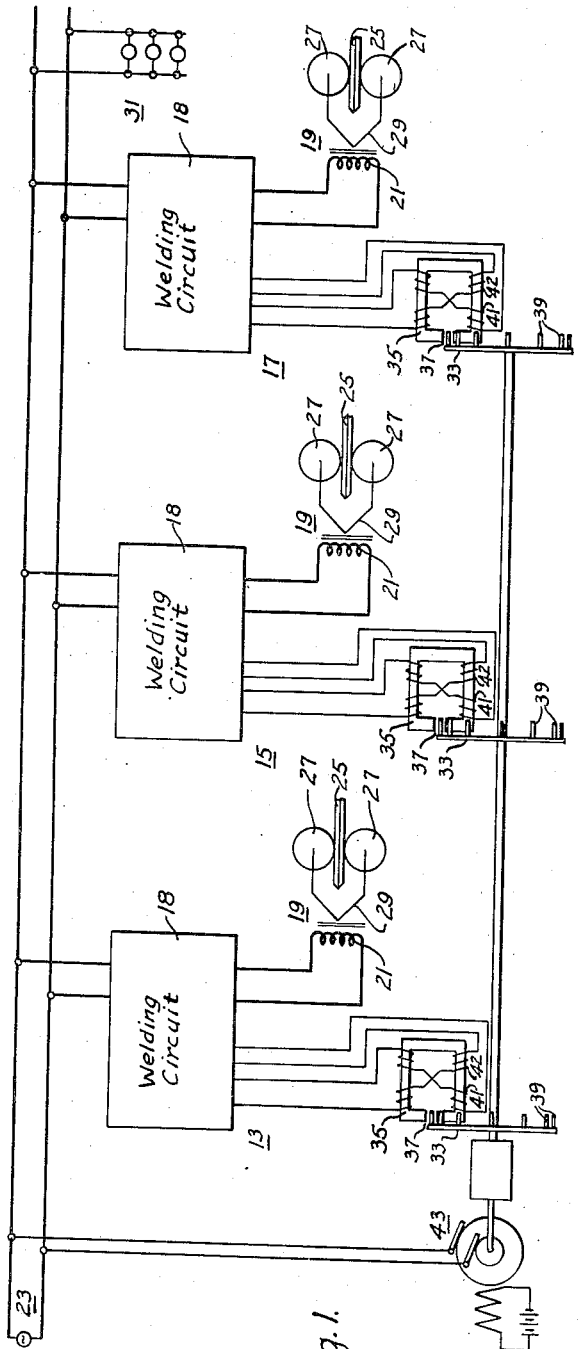
INVENTORS
Hymen Diamond and
John W. Dawson.
BY
F. W. Lyle,
ATTORNEY Aug. 6, 1940.  H. DIAMOND ET AL  2,210,710
CONTROL APPARATUS
Filed Jan. 29, 1938  5 Sheets-Sheet 3
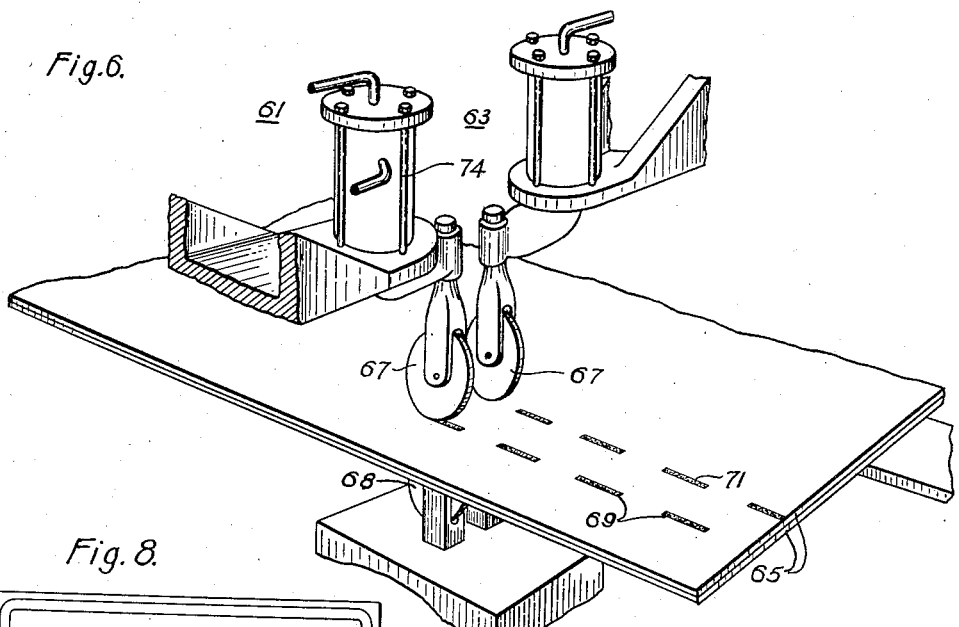
Fig. 6.
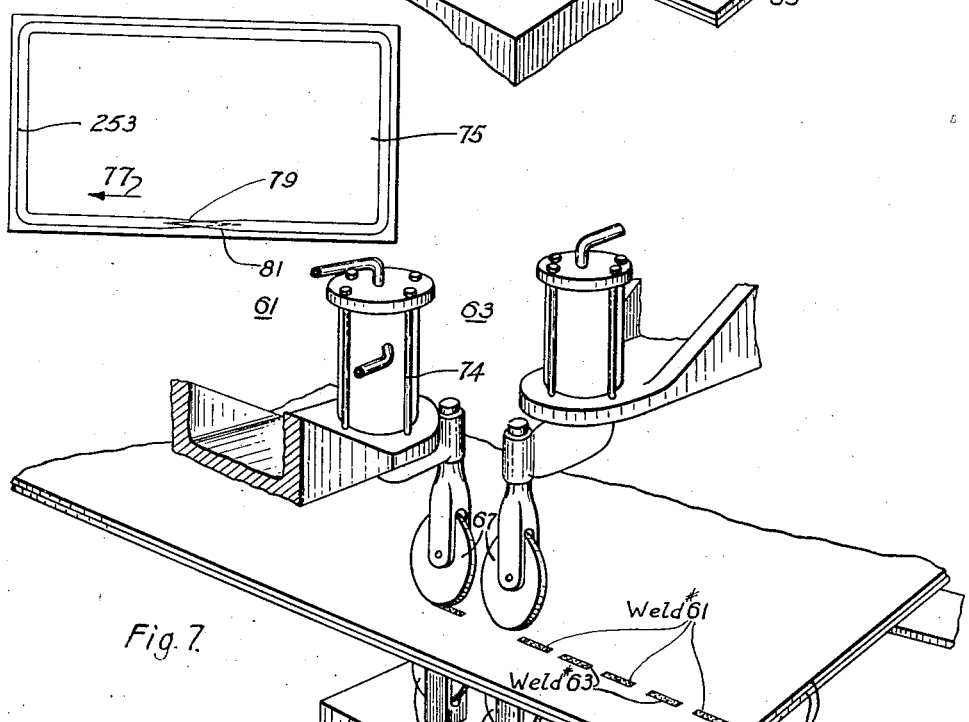
Fig. 8.
Fig. 7.
WITNESSES:
INVENTORS
Hymen Diamond and
John W. Dawson.
BY
ATTORNEY Patented Aug. 6, 1940

2,210,710

UNITED STATES PATENT OFFICE 2,210,710

CONTROL APPARATUS

Hymen Diamond, Pittsburgh, Pa., and John W. Dawson, Auburndale, Mass., assignors to Westinghouse Electric & Manufacturing Company, East Pittsburgh, Pa., a corporation of Pennsylvania Application January 29, 1938, Serial No. 187,701

8 Claims. (Cl. 219—4)

Our invention relates to control apparatus and it has particular relation to the control of resistance welding systems.

In resistance spot and seam welding pulses of current of considerable magnitude are intermittently drawn from a source for intervals of time of limited length. When current of this type is derived from the source, the potential output of the source fluctuates violently and this results in violent fluctuations in the power supplied to loads other than the welding apparatus that happen to be energized from the source. The difficulty arising from the abrupt variations in potential produced by the welding current is particularly aggravating when welding equipment is supplied from an ordinary commercial power source, for example, the ordinary 60 cycle commercial supply. In this case numerous lighting circuits are ordinarily connected to the commercial source in the neighborhood of the welding plant and the lights in these circuits flicker disagreeably.

It is an object of our invention to provide a welding arrangement that shall operate without producing violent fluctuations in the potential output of the source whereby the welding apparatus is supplied.

A more general object of our invention is to provide a plant, incorporating a plurality of individual systems, each of which requires heavy impulses of power intermittently that shall be operated in such manner from a source of power supplying other loads in addition to the plants that violent fluctuations shall not be produced in the other loads.

Another general object of our invention is to provide an arrangement incorporating a plurality of devices, each of which requires for operation a large impulse of current for a limited interval of time, wherein the individual devices shall cooperate in such manner that the necessary power shall be drawn from the source supplying the arrangement continuously.

A further general object of our invention is to provide an arrangement incorporating devices which inherently require power in intermittent pulses of considerable magnitude that shall function to draw power from a source continuously while at the same time consuming the power with a maximum efficiency.

An additional object of our invention is to provide an economically operating spot or seam resistance welding system that shall draw power from the source of supply continuously.

A specific object of our invention is to provide a method for welding a single material with a plurality of welders operating in such manner that the power drawn from the source is substantially continuous.

Another specific object of our invention is to provide a method of welding a single material in accordance with which the power required for producing the welding shall be increased gradually from zero to the normal value at the beginning of the welding operation and shall be decreased gradually from the normal value to zero at the end of the operation while at the same time the weld shall have the desired characteristics throughout.

A further specific object of our invention is to provide an arrangement of welding machines, each of which shall be of such structure that they shall be capable of operating together to weld a plurality of individual objects inserted therein at random, while the power drawn from the source by the whole arrangement shall at all times be continuous.

An ancillary object of our invention is to provide a method for operating a system of welders whereby the demand on the supply source shall be a minimum.

Still another ancillary object of our invention is to provide a method for operating a system of welders whereby the demand on the supply source at any instant shall be predictable.

More specifically stated, it is an object of our invention to provide a method and apparatus for the operation of a plurality of welding systems in such sequence that the power drawn from the supply source shall be continuous.

In accordance with our invention, the power drawn from a source by a plurality of welders or intermittent loads of other types is maintained uniform by operating the loads on a suitable time schedule. The operation is so timed that immediately on the termination of a current pulse delivered to one of the load circuits, a current impulse delivered to another load circuit is initiated. The source of supply is customarily periodic and the timing of the current pulses is generally in terms of periods of the source.

In welding apparatus specifically, current pulses are supplied for an interval of a certain number of periods of the source, successive intervals being separated by an equal or a different number of periods during which no current, or under certain circumstances a current too small for welding but large enough for heating or annealing, is supplied. The relationship of the active and passive intervals depends on the character of the welding load. We have found that for any relationship of the lengths of the active and passive intervals there is a finite number of welding systems which can be arranged to operate in succession in such manner that when a welding pulse supplied to one system is terminated, a pulse supplied to another system is always initiated so that the power drawn from the source is continuous.

The proper functioning of our invention involves the application of discrete current pulses to the welding load and the load must be so arranged that it lends itself with facility to such operation. In general, this involves the sub-division of the welding load into a number of units, each of which is supplied through a separate welding system. Where the load consists of a number of independent elements of the same material which are to be welded simultaneously, the problem of adapting the load to our invention is relatively simple. The elements of material are welded simultaneously, each in a separate welding system, and the timing of the welding systems is such that the power drawn from the source is continuous. Our invention is, of course, in no way limited to a single set of welding systems which operates as described above to draw uniform welding current from the source. Where a great number of individual elements of the same character are to be welded, an equal number of welding systems may be used and these systems may be sub-divided into sets of equal number with each set operating to draw uniform power from the source and corresponding systems of each set operating together.

Where the welding load consists of a single element to be welded, the welding systems comprising a set drawing uniform power from the source may be used together on the element. In such a case the total number of welds required for the material which would, in accordance with the prior art, be delivered by a single welder is divided up among all of the welders operating together. For example, if three welders are operating and if the material requires nine spots per inch, each of the three welders will produce three spots. It will be seen that in accordance with the prior art a single one of the welders would be required to draw sufficient power from the load to produce all of the nine spots. In accordance with our invention the same power is divided among three welders. The disposition of the welding electrodes in the case just mentioned depends on the character of the material. The electrodes of the welding systems may be so disposed adjacent to each other that the welds produced by the welders lie along a series of parallel lines. In other cases the sets of electrodes may be arranged so that the welds produced lie along a single line. In any case, the timing of the welding current flow and the speed of the material must be adapted to the particular contrivance adopted.

We have found that undesirable fluctuations are produced in the source when the action of a welding system or the like is started and stopped as well as during normal operation. In accordance with our invention, we provide an arrangement for suppressing also the fluctuations during starting and stopping. In this case the current output of the welding plant, which preferably consists of a plurality of welders operating as described above, is during the starting of the welding action gradually raised from zero to the normal value and when the welding action is to be stopped it is gradually decreased from the normal value to zero. The material to be welded is so moved during the complete operation that the starting interval during which the welding current rises and the stopping interval during which the welding current falls overlap so that a good weld is produced in spite of the variation in the welding current during starting and stopping.

Where a number of independent objects are to be welded, but the objects are to be inserted in the individual welders at random, the application of our invention involves certain difficulties since it is not practicable to start the welders merely at the time of insertion of the material and to make certain that the electrodes of the individual welders are applied to the objects in synchronism. The difficulty involved here is eliminated by supplying current continuously to the welding electrodes. When a material is not present between the electrodes of a welding system, the welding current is carried by a highly conductive element which is not deleteriously affected by the current. The insertion of the material between the welding electrodes open circuits the conductor and the welding current is transmitted through the material.

Figure 11:
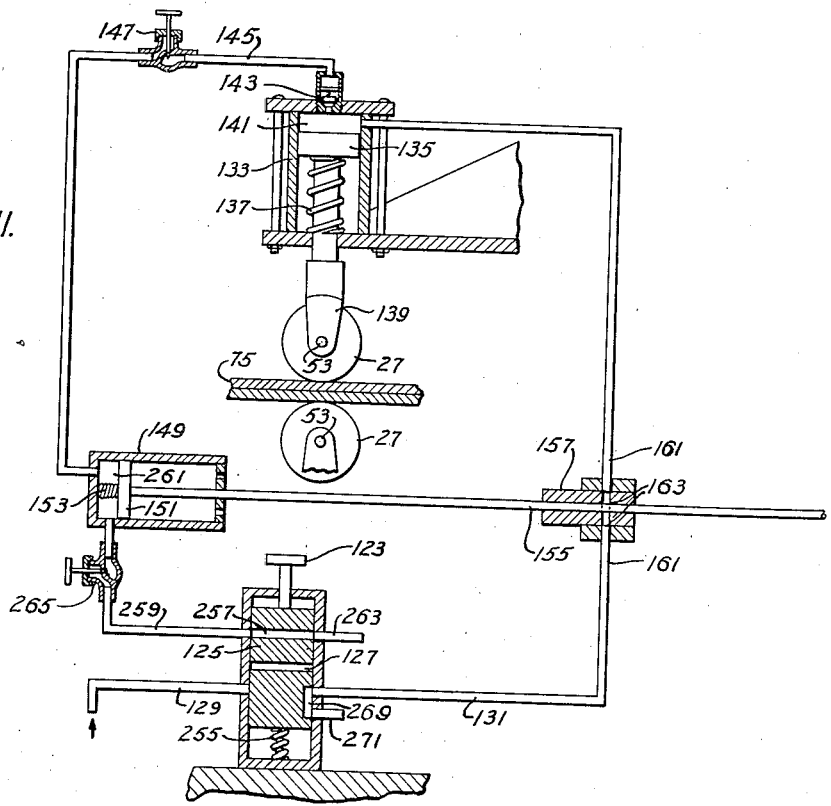
Figure 9:
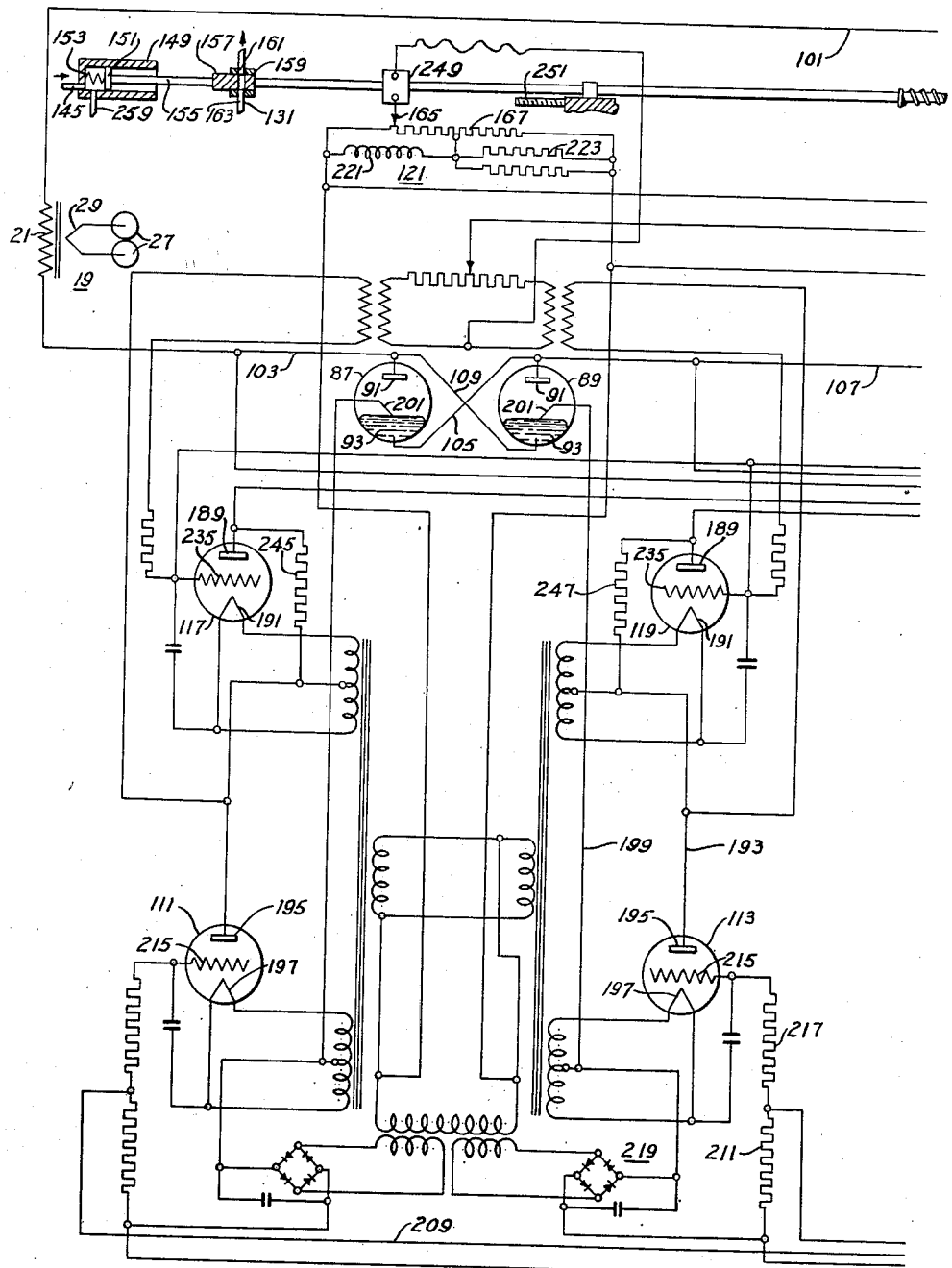
Figure 10:
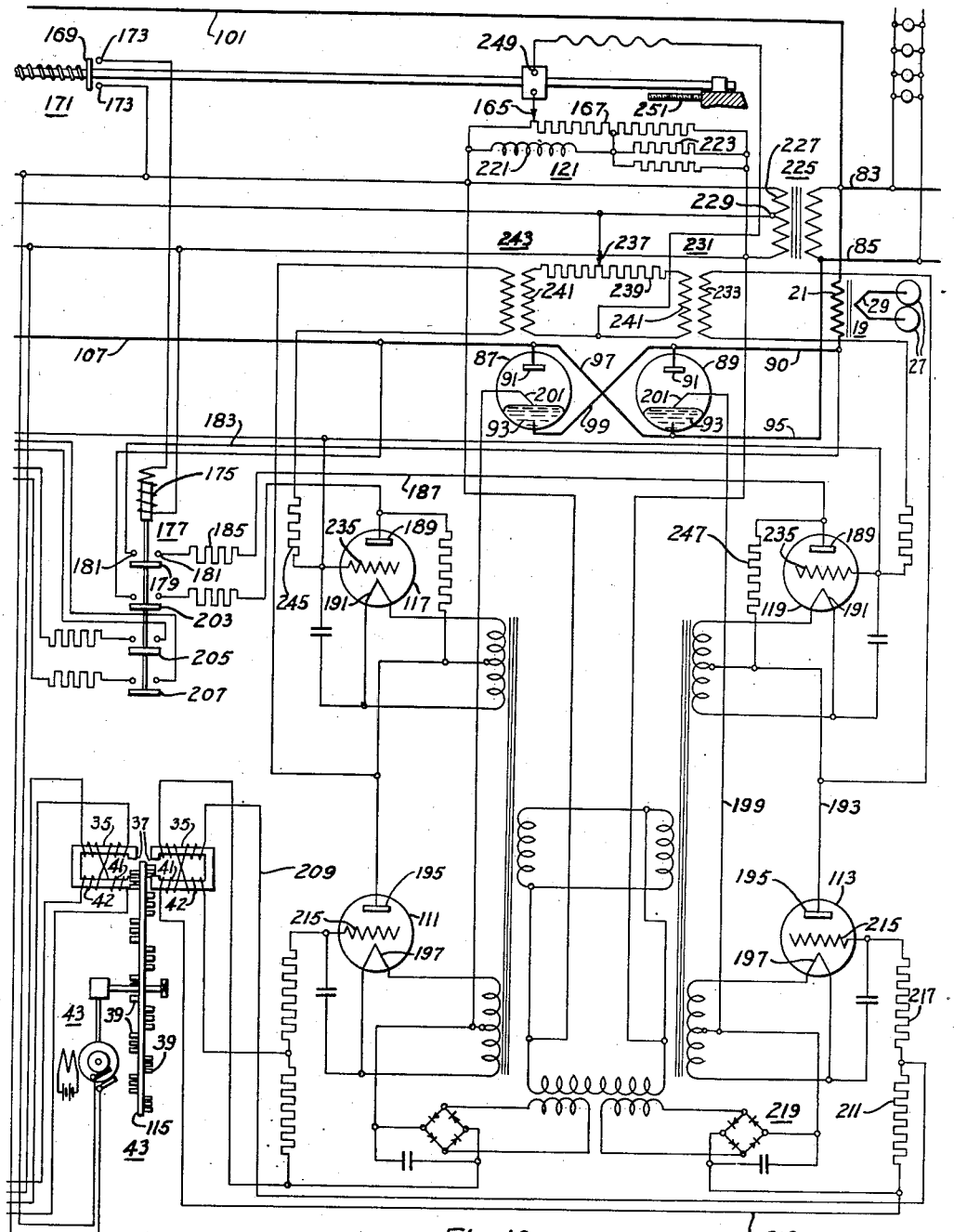

The novel features that we consider characteristic of our invention are set forth with particularity in the appended claims. The invention itself, however, both as to its organization and its method of operation together with additional objects and advantages thereof will best be understood from the following description of specific embodiments when read in connection with the accompanying drawings, in which:

Figure 1 is a diagrammatic view illustrating the general operation of our invention, Fig. 2 is a chart showing the schedule of operation of a plant of three welding systems in accordance with our invention, Fig. 3 is a chart showing the operation of a plant of eight welding systems in accordance with our invention, Fig. 4 is a diagrammatic view showing the essential features of a welding machine used in the practice of our invention when the material is not inserted between the electrodes, Fig. 5 is a diagrammatic view showing the same structure when material is inserted between the electrodes, Fig. 6 is a view in perspective showing an arrangement in which two welders operate in accordance with our invention on a single material, Fig. 7 is a view in perspective showing another arrangement in which two welders operate on a single material, Fig. 8 is a rectangular welded plate showing the overlap produced by variations in the welding current during the starting and stopping of the welders in accordance with our invention, Fig. 9 and 10 together constitute a diagrammatic view showing an arrangement in which two welders are operated in such manner as to draw uniform power from the source and to suppress fluctuations in the source during starting and stopping, and Fig. 11 is a diagrammatic view showing in detail the control device for apparatus of the type illustrated in Figs. 7 and 8.

The apparatus shown in Fig. 1 comprises a plurality of welding systems 13, 15 and 17, each provided with a welding transformer 19. The systems each incorporate welding circuits 18 which function to control the current flow and are interposed between the primaries 21 of the transformer 19 and a suitable source 23 of alternating current. The material 25 to be welded is inserted between welding electrodes 27 connected to the secondaries 29 of the transformers 19. In addition to the welding systems 13, 15 and 17, other loads symbolized by a lamp circuit 31 are supplied from the source 23.

The structure of the welding systems is not shown in detail. However, any of the structures now known in the art may be used. In general, such apparatus comprises a valve arrangement and means for controlling the valve arrangement in such manner that intermittent pulses of current are provided to the material 25 between the electrodes 27. The length of each pulse and the interval between pulses is measured out in half cycles of the source 23. The energy supplied by the current is determined by the point in the half periods of the source at which the transmission of current commences.

In the preferred practice of our invention, the specific structure of the welding arrangement may take the form disclosed in Patent No. 2,081,987 to John W. Dawson for Electric control system. In an arrangement of this type the timing of the supply of current to the material 25 to be welded and the control of the heat delivered by a welding system may take place by the operation of a disc provided with inductive pins. The disc is rotated in synchronism with the supply source and carries the pins through the air gap 37 of a wound rectangular core. Pulses are thus provided for controlling the conductivity of the valves. In the above-mentioned patent the structure of the disc and its associated elements is described in detail and reference is made to this patent for a more detailed description than is given herein.

In accordance with our invention, each of the welding systems 13, 15 and 17 is provided with a disc 33 and a wound rectangular core 35 through the air gap 37 of which the pins 39 of the disc pass. Potential impulses are thus produced in the coils 41 and 42 of the core. The impulses are impressed in the control circuits of the valves of the welding systems in the manner described in the above-mentioned patent.

The discs 33 are rotated together from the same synchronous motor 43 and thus the movement of the pins 39 through the air gaps 37 and the resultant potential impulses supplied to control the conductivity of the valves are synchronized. The pins 39 are so disposed in the different discs 33 that the valves are rendered conductive continuously. That is to say, the control by the synchronized discs 33 is such that the same welding current is always drawn by one or more of the welders. At the beginning of the welding process the operation of one of the welding systems is initiated and it passes a current pulse persisting for a number of half cycles. As soon as the transmission of current by the first welder is interrupted, the second welder begins to pass current, and as soon as the latter current is interrupted, the third welder begins to pass current, etc. The current discontinued by one welder is always supplied by another but any welder once started continues to pass current pulses for welding during the required number of active half cycles and to pass zero current or a current for annealing or pulsating during the passive number of half cycles. To every relationship between a given number of active half cycles and a given number of passive half cycles there corresponds a number of welders, the operation of which will be such that after the first impulse supplied by the last of the welders has stopped, the first welder is ready to pass current, so that the process may be regarded as taking place in a closed circle. The result of the operation of the welders, as described above, is that the power drawn from the source is uniform and, therefore, no fluctuations in the potential output of the source are produced and, accordingly, the operation of other loads such as the lamp circuit 31 supplied from the source is not affected by the welding plant.

The program of the operation of the welders depends in general on the number of welders and the number of active and passive half cycles. In Fig. 2, the schedule of operation for an arrangement of three welders, as specifically shown in Fig. 1, is charted. The active interval is assumed to be 2 half cycles and the passive interval 1. In preparing the chart in Fig. 2 the welders are identified by the indices 1st, 2nd and 3rd, and to each welder a column is assigned. The half cycles during which the operation takes place are numbered from an arbitrarily selected half cycle and to each half cycle a row is assigned. In the chart of Fig. 2 there are thus a number of spaces in which a symbol indicating the condition of any one of the welders during a given half cycle may be inserted. A zero is inserted in the spaces to indicate operation of the corresponding welder during the half cycle corresponding to the space; when a welder does not operate during a certain half cycle, the space is left blank. It will be seen by examining Fig. 2 that power equivalent to that required by two of the welders is continuously drawn from the source.

In Fig. 3 a similar chart for an arrangement in which the operation is with five active and three passive half cycles is shown. As can be seen, eight welders operating five at a time draw a continuous load on the power line. The charts in Figs. 2 and 3 indicate that there is a general relationship between the active and the passive half cycles and the number of welders required. This relationship may be expressed mathematically.

Let $n$ be the number of active periods and $r$ the number of passive periods. Further, let $$\frac{n+r}{n}$$

reduced to its lowest terms equal $$\frac{N}{D}$$

Then it may be demonstrated mathematically that the minimum number of welders required is equal to N. Of course this is only the minimum required because a plurality of welders may operate in sets of N, the corresponding welders of each set operating simultaneously. That the above relationship is correct can be seen from a consideration of Figs. 2 and 3.

The proof that the relationship is correct is relatively simple. Assume that the first welder begins to operate at a certain time and continues to operate independently. Each of its complete periods is equal to a time interval $n+r$ half periods of the source. At the end of the first pulse delivered by the first welder, the second welder will commence to operate and it will also continue to operate with the same periodicity. The same is true for the successive welders as each in its turn commences to operate. Finally, there will be one welder, the end of the first active period of which will coincide with the beginning of some active period of the first welder. The latter welder is the last one necessary in the set. The number of welders necessary is equal to the number of first active periods of length $n$ that pass before the end of a first active period coinciding with the beginning of some active period of the first welder.

Let $k$ equal the number of first active periods thus required, i. e., the number of welders required, and let $l$ equal the number of total periods of the first welder that pass before the end of the first period of the last welder. Then $$k \times n = l(n+r)$$

$$k = l \times \frac{n+r}{n} = l\frac{N}{D}$$

but in the above relationship $k$ is an integer and $$\frac{N}{D}$$

is a prime fraction. Therefore, the lowest value of $k$ is obtained for $l=D$ and this value is $N$.

In a welding plant operating in accordance with the teachings of our invention the welders that act together may be utilized to weld a plurality of independent elements or a single element. If they are used to weld a plurality of independent elements as in the Fig. 1 arrangement, then the feeding of the elements between the electrodes must be properly timed so that the welding current is supplied by the individual welders in the proper sequence. Where very long strips of material are to be welded for relatively long intervals of time, the timing involved here may not offer any great difficulties. However, where the strips to be welded are relatively short, the proper timing of the insertion of materials between the welding electrodes offers a problem of some magnitude since the feeding of the materials must be properly synchronized. The difficulties involved here may be avoided by eliminating the necessity of initiating the power supply to the secondary 29 of the welding transformers when the feed of the material to be welded begins. The structure of an arrangement for accomplishing this object is illustrated in Figs. 4 and 5.

Fig. 4 shows one set of welding electrodes 27 and the associated secondary 45 of a welding transformer constructed in accordance with this aspect of our invention in the absence of material to be welded. The secondary winding 45 of the transformer is formed from a metallic bar bent into a U-shaped structure having two parallel arms 47 and 49 with the portion 51 joining the arms having an angular configuration. The electrodes 27 are of the usual circular structure and are mounted on pins 53 supported at the ends of the parallel arms 47 and 49. The bar is constructed of some highly conducting metal and the arms 47 and 49 have sufficient resilience so that the electrodes 27 may be separated with facility for the insertion of a strip of material 25.

To one of the arms 47 a heavy contact 55 is secured and to the other arm 49 a heavy resilient spring 57 of highly conductive material carrying a corresponding contact 59 at its extending end is fastened. When there is no material 25 between the electrodes 27, the resilience of the parallel arms 47 and 49 causes the electrodes 27 and the contacts 55 and 59, respectively, to engage. The resilience of the spring 57 provides the pressure necessary to make certain that the contacts 55 and 59 are in intimate electrical engagement. When a strip of material 25 is inserted between the electrodes 27 as shown in Fig. 5, the arms 47 and 49 of the secondary 45 are opened and the contacts 55 and 59 are separated.

In a plant in which the feeding of material 25 to be welded between the electrodes 27 is timed at random, each of the welding systems 13, 15, 17 is provided with a welding transformer having a secondary such as is shown in Figs. 4 and 5. The supply of current to the secondaries is initiated when the operation of the plant is to commence and at this time care is taken to position the pins 39 in the discs 33 in such manner that the source 23 is subjected to uniform loading by the flow of current through the spring 57 and the contacts 55 and 59 of the transformers associated with all of the systems. Then the material 25 is inserted between the welding electrodes 27 in the usual manner by the operators of the machines. The operators do not have to work in synchronism for the proper operation of the plant because the load which it draws is totally unaffected by the absence of material between any set of electrodes 25. When material is not present between the electrodes, the current supplied to the corresponding secondary 45 is carried by the spring 57. When the material is inserted between the electrodes the contacts 55 and 59 are open and the current flows through the material. Each welding system therefore at all times carries its share of the current and the load is maintained balanced. It is to be noted that the impedance of the closed circuit including the spring 57 as shown in Fig. 4 should be equal to the impedance of the closed circuit including the work 25, as shown in Fig. 5.

When an arrangement of a plurality of welders operating in accordance with our invention is to be used to weld a single article, the electrodes and the material must be so arranged that the proper cooperation exists. This may be accomplished for example by an arrangement such as is shown in Fig. 6, in which two cooperative welders 61 and 63 are utilized for welding two plates 65 together. In this arrangement the electrodes 67 and 68 of the welders are disposed with their faces in parallel planes and parallel rows of welds 69 and 71 are produced in the material.

An alternative arrangement is shown in Fig. 7 in which the electrodes 67 and 68 of the welders 61 and 63 are disposed with their faces in the same plane. In such a case a single row of welds 73 is produced. Both of the welders 61 and 63 do not, of course, produce welds at the same points. One welder produces a set of spaced welds and the other welder produces the intermediate set. This is illustrated in Fig. 7 by the labels identifying the welds.

In the arrangements of both Figs. 6 and 7, the movable electrode 67 is actuated pneumatically by the movement of a piston within a suitable chamber 74. The movable electrodes 67 may of course be spring actuated as in the Figs. 4 and 5 arrangement in lieu of being actuated by compressed air. On the other hand the short circuiting spring 57 may be utilized in the Figs. 6 and 7 arrangement.

To suppress the difficulties which arise by the starting and the stopping of the welding action, we propose to gradually increase the welding current at the beginning of the operation and to gradually decrease it at the end of the operation. This aspect of our invention may be carried out with advantage with electrodes having the structure shown in Figs. 9 and 10. However, it may also be carried out with the ordinary welding electrode structures and this is particularly applicable where a single material is to be welded. In such a case, the welding electrodes are applied to the material as soon as the supply of welding current is initiated. Since the supply of insufficient current may engender a weak spot in the weld during the current increasing or decreasing interval, the supply of current at the end of the welding action takes place when the electrodes are in the region in which the increase took place.

This is illustrated in Fig. 8. The welding of the plate 75 takes place in a clockwise direction as indicated by the arrow 77. The lower tapered portion 79 is produced at the beginning of the welding action and the upper tapered portion 81 at the end of the action. The overlap weld thus produced is as rigid as a weld produced by normal current flow. Of course, the plate 75 may also be so welded that the current increasing portion of the weld is overlapped by a weld produced by normal current flow. For certain materials which are of such character as to be unaffected by the low current during the initiation of the welding, the latter procedure may be preferable to the overlap of the tapered weld portions.

An arrangement for obtaining a weld of the type shown in Fig. 8 with two welders operating so as to draw uniform power from the line is shown in Figs. 9, 10 and 11. In this arrangement the welding current is supplied to each of the primaries 21 of the welding transformers 19 from a pair of alternating current line conductors 83 and 85 through a pair of mercury pool electric discharge paths 87 and 89 of the immersed ignition-electrode type.

Current of one polarity flows through the right-hand primary 21 in a circuit extending from the upper line conductor 83 through the primary, a conductor 90, the anode 91 and the cathode 93 of the right-hand discharge path 89, a conductor 95 to the lower conductor 85. The welding current of the opposite polarity flows from the lower line conductor 85 through the conductor 95, a conductor 97, the anode 91 and the cathode 93 of the left-hand electric discharge path 87, a conductor 99, the conductor 90, the primary 21 to the upper conductor 83. Correspondingly, the current of the first polarity flows through the primary 21 of the left-hand welding transformer 19 in a circuit extending from the upper line conductor 83 through a conductor 101, the primary 21, a conductor 103, the anode 91 and the cathode 93 of the corresponding left-hand discharge path 87, a conductor 105, a conductor 107, the conductor 97, the conductor 95 to the lower line conductor 85. The current of the opposite polarity flows through the same primary in a circuit extending from the lower line conductor 85, through the conductor 95, the conductor 97, the conductor 107, the right-hand discharge path 89, a conductor 109, the conductor 103, the primary 21, the conductor 101 to the upper line conductor 83.

For the purpose of timing, the welding current discharge paths 87 and 89 in the primaries 21 of the welding transformers 19 are each controlled through auxiliary electric discharge devices 111 and 113, respectively, from a magnetic impulsing disc of the type discussed above in the manner explained more in detail in the Dawson Patent No. 2,081,987. However, for convenience a single disc 115, having grooves for inserting pins 39 in both its faces is used. This disc is rotated by the usual synchronous motor 43. As the disc 115 rotates the pins 39 on each side pass through the air gap 17 in a magnetic core 35 and induce potential impulses in the windings 41 and 42 of the core. The control of the heat supplied to weld the material also takes place through a pair of auxiliary electric discharge devices 117 and 119, one device being associated with each main discharge path. The pair of heat control devices of each welding system 117 and 119 are controlled from a phase shift network 121 as is explained in the Dawson patent. The operation of the apparatus shown in Figs. 9 and 10 is controlled by the pneumatic system shown in Fig. 11. When the welding of the plate 75, such as is shown in Fig. 6, is to be initiated, the operator compresses a treadle 123. The treadle carries a plunger 125 downward until an opening 127 in the plunger connects an inlet conductor 129 from a compressed air supply (not shown) with a supply conductor 131. Compressed air flows through the supply conductor 131 to a piston chamber 133 and moves a piston 135 downward against the action of a spring 137. The piston 135 carries with it the movable welding electrodes 27, causing them to energize the work 75 which is disposed on the fixed welding electrodes 27. In Fig. 11 a single electrode arrangement is shown. The piston 135, of course, actuates both movable electrodes, or in the case where more than two sets of electrodes are used, it actuates all of the movable electrodes. The mechanical connection between the movable electrodes may be of comparatively simple structure. For example, the bushings 139 for all of the movable electrode pins 53 may be carried by an insulating bar or they may be insulatingly supported on a metallic bar.

The operator holds the treadle 123 down during the whole welding operation and after the electrodes 27 are engaged with the work 75 a considerable back pressure is built up in the region 141 of the chamber 133 above the piston 135. The pressure in region 141 causes a poppet valve 143 in the top of the chamber 133 to open and the air compressed in the region 141 flows slowly through a conductor 145 provided with a needle valve 147 into a second piston chamber 149 where it gradually moves another piston 151 against the action of a spring 153. The piston 151 carries a rod 155 on which a sleeve 157 is supported at an intermediate point. The sleeve 157 slides in a bushing 159 at which intermediate opposite ends 161 of the supply conductor terminates. The ends 161 communicate through opening 163 in the sleeve as long as the piston 151 and the rod 155 are in the extreme left position. When the rod is moved towards the right, the communicating tubes 163 in the sleeve are moved away from the ends 161 and the conductor 131 is closed so that the supply of air to the chamber 133 is discontinued. However, under the action of the over-pressure in the region 141, the movement of the piston 151 and the rod 155 may continue for a substantial distance after the tube 131 is closed.

In addition to the sleeve 157, the rod 155 carries a plurality of intermediate taps 165, each of which engages a voltage divider 167. The voltage dividers 167 are associated with the phase shift networks 121 whereby the conductivity of the heat control devices 117 and 119 is adjusted. As the rod 155 moves and advances the taps 165, the phase of the potential supplied to the control circuits of the associated heat control devices 117 and 119 is varied in such a sense that the devices become conductive gradually earlier in the half cycles of the potential supplied by the source 83—85. However, the movable contactor 169 of a starting switch 171 is slidably supported on the rod 155 and moves with the rod until it engages fixed contacts 173. After the electrodes 27 have engaged the material, the actual operation commences when the contactor 119 engages the fixed contacts 173, closing the circuit through the coil 175 of a starting relay 177.

When the relay 177 is thus energized, its upper movable contactor 179 engages corresponding fixed contacts 181 and a circuit is closed which extends from the upper alternating line conductor 83 through the primary 21 of the right-hand welding transformer 19, a conductor 183, the movable contactor 179 of the starting relay 177, a current limiting resistor 185, a conductor 187, the anode 189 and the cathode 191 of the right-hand heat control device 119 associated with the right-hand welding system, a conductor 193, the anode 195 and the cathode 197 of the corresponding timing device 113, a conductor 199, the ignition electrode 201 of the corresponding main discharge path 89, the conductor 95 to the lower alternating line conductor 85. Corresponding circuits are also closed through the other heat control devices 117 and 119 and the other timing devices 111 and 112 by the closing of the other three movable contactors 203, 205 and 207 of the starting relay 177.

It is seen that a heat control device 117 or 119 and a timing device 111 or 113 are connected in series through the ignition electrodes 201 of each of the main discharge paths 87 or 89, respectively. When both of the auxiliary devices associated with any one main discharge path are inductive, current flows through the corresponding ignition electrode and the main discharge path is rendered conductive. The number of half periods of the source during which the main paths 87 and 89 are conductive is determined by the timing devices 111 and 113 and the points in each of the conductive half periods at which the conductivity is initiated are determined by the heat control devices 117 and 119.

The timing devices 111 and 113 in each of the welding systems are controlled from the magnetic pins 39 inserted in the faces of the disc 115 which rotate in synchronism with the source 83—85. The positioning of the pins in the disc 115 corresponds to the desired timing. The faces of the disc are provided with grooves that are so spaced that one passes between the air gaps 37 during each half period of the source and therefore if pins are present in the grooves on either side, they will pass through the corresponding air gap during each period of the source. Pins are accordingly inserted in groups of successive grooves in each face to an extent depending on the number of half periods during which welding current is to be conducted and intermediate sets of grooves in the same face are left pinless. For the specific arrangement described here the number of grooves with pins is equal to the number of pinless grooves. The pins in the opposite face of the disc 115 are inserted in grooves corresponding to the pinless grooves in the first mentioned face so that for every half period of the source a pin passes through one or the other of the air gaps 37.

The pins 39 produce potential impulses in the corresponding coils 41 and 42 and the impulses are supplied to the control circuits of the timing devices 111 and 113 to render them conductive. The impulses are supplied to the right-hand timing device 113 of the right-hand welding system in a circuit extending from the upper terminal of the coil 41 wound on the right-hand core 35, through a conductor 209, a resistor 211, a conductor 213 to the lower terminal of the coil 41. The upper terminal of the resistor 211 is connected to the control electrode 215 of the right-hand timing device 113 through a second resistor 217 and the lower terminal of the first resistor 211 is connected to the cathode 197 of the timing device through a biasing potential 219. The other coil 42 of the same core 35 and the coils 41 and 42 of the other core 35 are similarly connected to the other timing devices 111 and 113 and corresponding impulses are impressed in the control circuits of the latter devices. Since an impulse is produced by a pin 39 for each half cycle of the source 83—85, a timing device is conductive during each half cycle of the source. The timing devices 111 and 113 associated with the right-hand welding system are conductive while pins 39 pass through the right-hand gap 37 and the timing devices of the left-hand system are conductive while the pins in the other face of disc 115 pass through the left-hand gap 37.

Control potential is supplied to the heat control devices 117 and 119 from the phase shift network 121. The phase shift network 121 is of the usual structure comprising a reactor 221 and a resistor 223, and all of the networks are supplied from an auxiliary supply transformer 225, the secondary 227 of which has the usual intermediate tap 229. The right-hand heat control device 119 associated with the right-hand welding system is coupled to the corresponding network 121 through the control transformer 231, the secondary 233 of the transformer being connected between the control electrode 235 and the cathode 191 of the device. As is the customary practice, the intermediate tap 229 of the secondary 227 of the supply transformer 225 is connected to an adjustable tap 237 of a resistor 239 which extends between the upper terminals of the primary 241 of the control transformer 231 just mentioned and the upper terminal of the primary 241 of the control transformer 243 associated with the other heat control device 117 of the same welding system. The lower terminals of the same primaries 241 are connected together and their common junction point is connected to the movable tap 165 of the associated voltage divider 167. A potential, the phase of which relative to the potential of the main source 83—85, depends on the setting of the movable tap 165, is thus impressed in the control circuit of the right-hand heat control device 119 under discussion here and similar potentials are impressed in the control circuits of the left-hand heat control device 117 of the same system and of the heat control devices 117 and 119 associated with the other welding system. The potentials thus impressed are of sufficient amplitude to render the corresponding heat control devices conductive if the anode-cathode potential supplied to them is of proper polarity and if their circuits are closed as is the case when the timing devices 111 and 113 are conductive. Initially, however, the phase of the potential supplied in the control circuits of the heat control devices 117 and 119 is such that the devices would be rendered conductive later in the half periods of the source. The phase is changed as the contacts 165 move towards the right and the instant in the half periods at which the discharge devices 117 and 119 are rendered conductive becomes progressively earlier.

From the foregoing discussion it is seen that the timing devices 111 and 113 are rendered conductive by the impulses produced by the pins and the heat control devices are rendered conductive by the impulses supplied through the phase shift network 121. Since each of the heat control devices are in series circuit with a corresponding timing device, current cannot flow through the former unless the latter are conductive and therefore, the actual current flow through a heat control device, a timing device, and the corresponding ignition electrodes during a given half period is governed by the movement of the pins 39 through the gaps 37.

The potential produced by the pins 39, however, is of such character that the timing devices 111 and 113 are rendered conductive relatively earlier in the half periods than the earliest instants at which the corresponding heat control devices 117 and 119 are rendered conducting. To provide for the current flow through the timing devices 111 and 113 during the interval in any half period between the initiation of the conductivity of a timing device and the initiation of the conductivity of the corresponding heat control device, resistors 245 and 247 shunting the heat control devices 117 and 119, respectively, are provided. The resistors are of substantial magnitude and for this reason the current flow through the corresponding ignition electrodes 201 is insufficient to render the corresponding main discharge paths 87 and 89 conductive. However, when the heat control devices 117 and 119 are rendered conductive, the corresponding resistors 245 and 247, respectively, are bridged and the current flow is sufficient to render the main discharge paths 87 and 89 conductive and current flow through the welding transformer primaries 21 is produced.

As has been explained, the operation of the pins is such that welding current flows through one or the other of the primaries during each half cycle of the source so that at all times the power drawn from the source is continuous. However, by reason of the initial setting of the taps 165, the current is initially relatively small. As the rod 155 moves towards the right carrying the contacts 165, the heat control devices 117 and 119 are rendered conductive earlier and earlier in the half periods and the welding current is gradually increased. During the intervals during which the current is increasing, the tapered portion 79 of the weld which points towards the right in Fig. 8 is produced. The rod 155 continues to move until the blocks 249 carrying the contacts 165 engage adjustable stops 251 and at this time the main discharge paths are rendered conductive at instants in the half periods corresponding to the normal welding current required. The welding now continues at the latter fixed current value until the welding of the plate 75 is substantially complete. The corresponding portion of the weld in Fig. 8 is represented by the parallel lines 253 which extend around the plate 75.

When the welding electrodes 27 return to a region within the tapered weld portion 79, or sometimes to the portion represented by the lines 253, the treadle 123 (Fig. 11) is released. The plunger 125 now moves upward under the action of a spring 255 and an opening 257 in the plunger connects a tube 259 leading from the region 261 in the chamber 149 above the rod piston 151 to an outlet tube 263. The latter tube is provided with a needle valve 265 and the air in the region 261 flows slowly out, permitting the return of the piston 151 and the rod 155. As the rod 155 moves towards the left, the movable taps 165 are moved along the voltage divider 167. The plunger 125 also carries a longitudinal opening 269 along its right-hand edge and when it is in the up position the opening 269 connects the tube 135 to an outlet tube 271. However, by reason of the fact that the tubulations 163 in the sleeve 157 are not aligned with the ends 161 of the tube 131, the air in chamber 141 remains compressed and the electrodes 27 remain in engagement with the work so that current may flow through the work.

On the other hand the current flow through the welding electrodes 27 gradually decreases by reason of the movement of the tap 167 which causes the heat control devices to be rendered conductive later and later in the half periods. This movement continues until the current flow is substantially zero and the tapered weld 81 pointing towards the left in Fig. 8 is produced. When the rod 155 has attained its original position, the openings 161 in the sleeve 157 are again aligned with the two ends 161 of the conductor 131 and the compressed air in the region 141 of piston chamber 133 is attenuated through the outlet tube 271. The apparatus is set for the welding of another plate 75. It is to be noted that during the whole previous welding operation there has been no abrupt loading of the source 93—95.

Although we have shown and described certain specific embodiments of our invention, we are fully aware that many modifications thereof are possible. Our invention, therefore, is not to be restricted except insofar as is necessitated by the prior art and by the spirit of the appended claims.

We claim as our invention:

1. The method of drawing power continuously through a plurality of valve circuits from a source to a load means that requires power in intermittent pulses $n$ units of time in length at intervals of $r$ units of time—$n$ and $r$ being unequal—, which comprises supplying said load means through $n+r$ valve circuits operating in circuitous succession, each circuit in its turn passing current to said load means during $n$ units of time and restraining the passage of current to said load means during $r$ units of time and each circuit in its turn always initiating the passage of $n$ units at the beginning of a restraining interval for the same preceding circuit.

2. The method of drawing power continuously through a plurality of valve circuits from a source to a load means that requires power in intermittent pulses $n$ units of time in length at intervals of $r$ units of time—$n$ and $r$ being unequal and $$\frac{n+r}{n}$$

reduced to its lowest terms being $$\frac{N}{D}$$

which comprises suplying said load means through not less than N valve circuits operating in circuitous succession, each circuit in its turn passing current to said load means during $n$ units of time and restraining the passage of current to said load means during $r$ units of time and each circuit in its turn always initiating the passage of $n$ units at the beginning of a retraining interval for the same preceding circuit.

3. The method of drawing power continuously through a plurality of valve circuits from a source to a load means that exists as a single unit and requires power in intermittent pulses $n$ units of time in length at intervals of $r$ units of time—$n$ and $r$ being unequal and $$\frac{n+r}{n}$$

reduced to its lowest terms being $$\frac{N}{D}$$

which comprises sub-dividing the load means into N load elements supplying each of said load elements through a separate valve circuit, the valve circuits for the N elements operating in circuitous succession, each circuit in its turn passing current to said load means during $n$ units of time and restraining the passage of current to said load means during $r$ units of time and each circuit in its turn always initiating the passage of $n$ units at the beginning of a restraining interval for the same preceding circuit.

4. The method according to claim 3 characterized by the fact that each load element is supplied with $$\frac{1}{N}$$

of the total power which would be required by the load means if the total load means were supplied through a single valve system.

5. The method of loading an alternating source uniformly while it supplies power for welding a material which requires welding current in intermittent pulses $n$ half-periods of said source in length at intervals of $r$ half-periods of said source—$n$ and $r$ being unequal and $$\frac{n+r}{n}$$

reduced to its lowest terms being $$\frac{N}{D}$$

through a plurality of welders each having welding electrode means to engage said material which comprises dividing the material into N elements, engaging the electrode means of one of said welders with each said elements and supplying welding current through said engaged welding electrodes in circuitous succession, each set of engaged electrodes being supplied during $n$ half-periods of said source at intervals of $r$ half-periods of said source, and the welding current through any one of said sets of engaged electrodes being always initiated at the beginning of a pause interval for the same preceding one of said sets of engaged electrodes.

6. The method of loading a source uniformly while it supplies power for welding a material which requires welding current in intermittent pulses $n$ units of time in length at intervals of $r$ units of time—$n$ and $r$ being unequal and $$\frac{n+r}{n}$$

reduced to its lowest terms being $$\frac{N}{D}$$

through a plurality of welders each having welding electrode means to engage said material, which comprises dividing the material into N elements, engaging the electrode means of one of said welders with each said elements and supplying welding current through said engaged welding electrodes in circuitous succession, each set of engaged electrodes being supplied during $n$ units of time at intervals of $r$ units of time, and the welding current through any one of said sets of engaged electrodes being always initiated at the beginning of a pause interval for the same preceding one of said sets of engaged electrodes.

7. Apparatus for welding material by intermittently passing current therethrough from a source comprising a plurality of welding systems each having welding electrodes and including current conducting means by-passing said welding electrodes, each said current conducting means having a conductivity of such magnitude that it is not deleteriously affected by a current of the magnitude of the welding current supplied by the welding system in which it is present, and said welding electrodes and said by-passing means having contacts closed when no material to be welded is present between the welding electrodes and opened by relative movement of said electrodes when material is introduced therebetween, and means for supplying current impulses through said welding systems, to weld the material, if any, present in any of said systems or through the corresponding conducting means in the systems in which no material is present, the current impulses of the different welding systems being so timed that the current drawn from said source is substantially uniform.

8. Apparatus for welding material by intermittently passing current therethrough from a source comprising a plurality of welding systems each having means for contacting said material for the purpose of welding it, and including current conducting means by-passing said contacting means, each said current conducting means being a conductivity of such magnitude that it is not deleteriously affected by a current of the magnitude of the welding current supplied by the welding system in which it is present, and said contacting means and said by-passing means having contacts closed when no material to be welded is present between the welding electrodes and opened by relative movement of said electrodes when material is introduced therebetween, and means for supplying current impulses through said welding systems, to weld the material, if any, present in any of said systems or through the corresponding conducting means in the systems in which no material is present, the current impulses of the different welding systems being so timed that the current drawn from said source is substantially uniform.

HYMEN DIAMOND.
JOHN W. DAWSON.